United States Patent [19]
Nowak et al.

[11] Patent Number: 6,000,499
[45] Date of Patent: Dec. 14, 1999

[54] SYSTEM FOR LUBRICATING MULTI-SPINDLE REVOLVING HEAD MECHANISM

[75] Inventors: Florian I. Nowak, Newington; Jay P. Giblin, Cheshire; Gary F. Nowak, Newington, all of Conn.

[73] Assignee: Nowak Products, Inc., Newington, Conn.

[21] Appl. No.: 09/027,077

[22] Filed: Feb. 20, 1998

[51] Int. Cl.⁶ .................................................. F01M 1/00
[52] U.S. Cl. .......................... 184/6.14; 184/5; 184/6.26; 384/13; 384/322
[58] Field of Search ................ 184/5, 6.14, 6.26, 184/7.1, 9, 18; 384/13, 322

[56] References Cited

U.S. PATENT DOCUMENTS

| | | | |
|---|---|---|---|
| 1,504,349 | 8/1924 | Hoke | 184/5 |
| 2,447,509 | 8/1948 | Kocherq | 184/6.14 |
| 2,728,414 | 12/1955 | Drissner | 184/6.14 |
| 3,109,514 | 11/1963 | Deflandre | 184/6.14 |
| 3,276,677 | 10/1966 | Trask | 184/18 |
| 3,834,493 | 9/1974 | Hubert | 184/6.26 |
| 3,905,450 | 9/1975 | Percson | 184/6.14 |
| 5,205,376 | 4/1993 | Nowak | 184/6.14 |
| 5,593,003 | 1/1997 | Abe et al. | 384/13 |

Primary Examiner—John A. Jeffery
Assistant Examiner—Chong H. Kim
Attorney, Agent, or Firm—Ira S. Dorman

[57] ABSTRACT

A multiple-spindle mechanism employs an arrangement of passages, grooves, and ducts that promotes continuous and simultaneous lubrication of all spindles. The mechanism is especially well suited for use in an automatic screw machine.

11 Claims, 3 Drawing Sheets

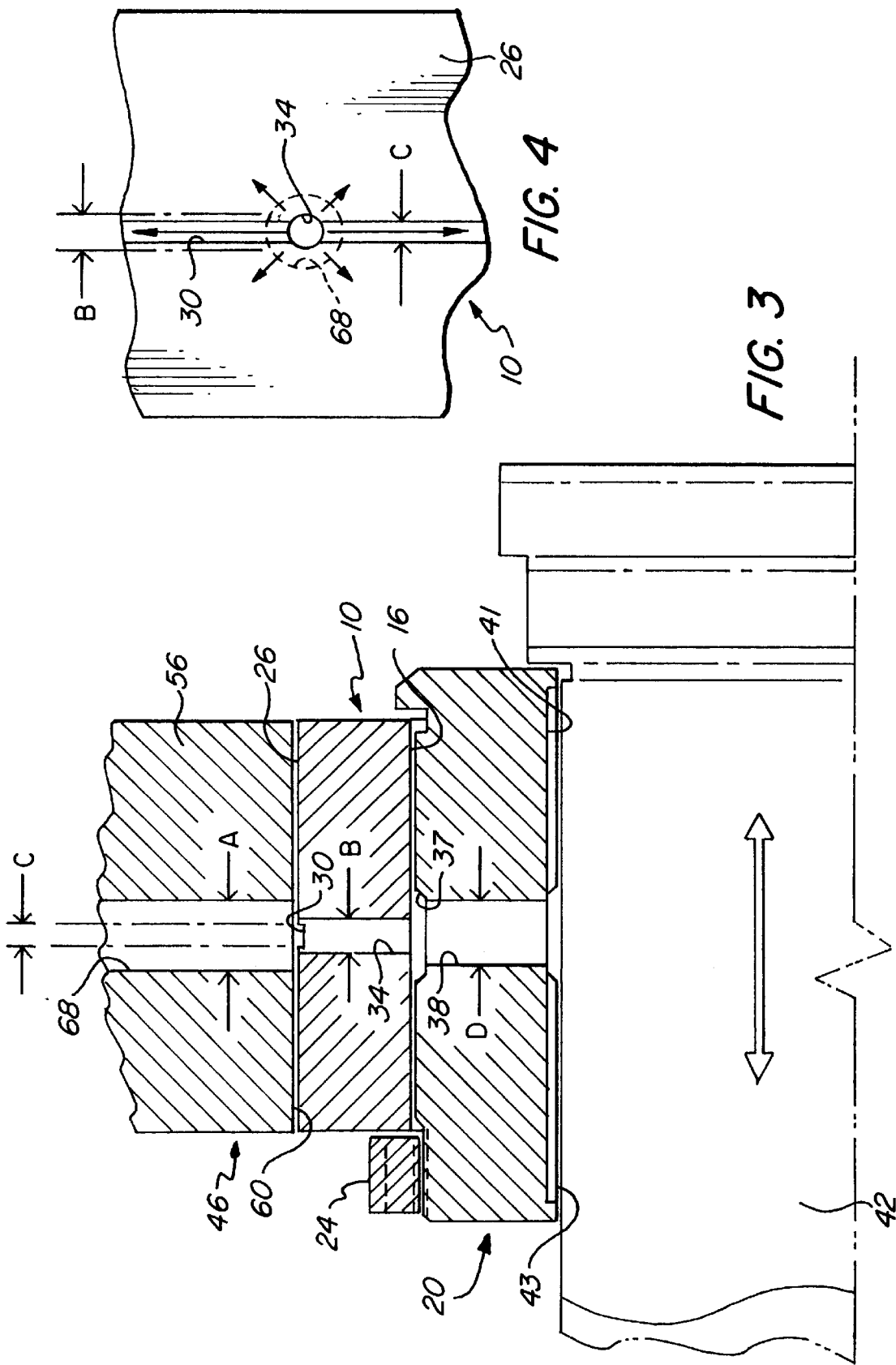

6,000,499

SYSTEM FOR LUBRICATING MULTI-SPINDLE REVOLVING HEAD MECHANISM

BACKGROUND OF THE INVENTION

Due to the complexity of multiple spindle mechanisms of the kind employed in automatic screw machines and the like, difficult problems of lubrication are presented. The following patents are representative of efforts that have been made in the past to achieve effective lubrication:

| U.S. No. 1,125,031 | U.S. No. 3,351,392 |
|---|---|
| U.S. No. 2,245,105 | U.S. No. 4,068,740 |
| U.S. No. 2,379,944 | U.S. No. 4,344,507 |
| U.S. No. 2,625,448 | U.S. No. 4,905,794 |
| U.S. No. 2,728,414 | Canada No. 0473189 |

In U.S. Pat. No. 5,205,376, Nowak provides a system by which a multiple-spindle mechanism is lubricated, and is protected against the entry of foreign matter, by a mist of oil which is distributed under pressure between mutually contacting bearing surfaces, and is discharged outwardly thereof. The mechanism is especially suited for use in an automatic screw machine.

Despite the foregoing, a need exists for an improved system by which all spindles of a multiple-spindle mechanism are simultaneously and continuously lubricated, and it is therefore the broad object of the present invention to provide such a system and a mechanism and machine embodying and incorporating the same.

A more specific object of the invention is to provide such a system by which lubrication of lower position spindles may be favored.

Additional objects of the invention are to provide a mechanism and machine having the foregoing features and advantages, which are relatively incomplex and especially well suited for use in and as a multiple-spindle automatic screw machine, and which help to extend the useful life of the spindles and other components and to ensure smooth and trouble-free operation.

It has now been found that certain of the foregoing and related objects of the invention are attained in a multi-spindle mechanism that includes a housing having a forward journal portion with a circular internal bearing surface; a revolving head mounted for rotation in the housing and comprising a front boss having a circumferential external bearing surface in contact with the internal bearing surface of the housing, and a multiplicity of spindle bearings mounted at locations spaced about the front boss, each of the spindle bearings having an internal bearing surface; a multiplicity of spindles, each rotatably mounted in an associated one of the spindle bearings and having a cylindrical external bearing surface in contact with the internal bearing surface of the associated bearing; and means for supplying liquid lubricant to at least certain of the bearing surfaces in contact with one another. A continuous groove circumscribes the front boss of the revolving head, and a multiplicity of oil ducts operatively connect the internal bearing surface of each spindle bearing to the circumscribing groove. The means for supplying lubricant communicates with the circumscribing groove of the head through a passage in the housing in which the head is mounted, which passage opens onto the circumferential external bearing surface at the entrance to the groove formed into the boss. The opening from the passage has a "first" area, and encompasses a circumferential portion of the groove entrance, which portion has a "second" area that is substantially smaller than the "first" area (by virtue of the narrowness of the groove). In addition, the smallest cross section along the length of each of the connecting oil ducts has a "third" area that is at least as large as the "second" area, and preferably substantially larger. Most desirably, the "third" area will have a value equal to about 40% to 60% of the value of the "first" area, and the "second" area will have a value equal to about 40% to 60% of the value of the "third" area.

The duct connecting the internal surface of each of the spindle bearings to the groove in the head boss will generally comprise two sections lying sequentially along a radius from the axis of rotation of the associated spindle, one duct section extending through the boss and the other extending through the spindle bearing. Each duct section will typically have a substantially uniform cross section along substantially its entire length, with the cross section of the more outward of the duct sections having the "third" area and with the cross section of the more inward duct section having a "fourth" area that is larger than the "third" area; the "fourth" area will desirably have a value substantially equal to that of the "first" area.

In most instances the housing will include a rearward journal portion with a "second" circular internal bearing surface coaxial with the first-mentioned circular internal bearing surface, and the head will have a rear boss with a circumferential external bearing surface in contact with the "second" internal bearing surface. A "second" continuous groove will be formed into the circumferential external bearing surface of the rear boss, and at least one duct will operatively connect the internal bearing surface of each of the rear boss spindle bearings to the "second" circumscribing groove. A "second" passage operatively connected to the lubricant supplying means will open onto the circumferential external bearing surface of the rear boss, and will encompass a circumferential portion of the entrance to the "second" circumscribing groove. In such an embodiment of the mechanism, the encompassed circumferential portion of the "second" groove entrance will also have an area that is substantially smaller than the area of the opening from the "second" passage.

The invention is applied to greatest advantage in mechanisms in which the spindles reciprocate linearly on their axes of rotation, which axes will normally be equiangularly spaced and parallel to the axis of head rotation. Most desirably, the mechanism will be employed in an automatic screw machine, commonly having five spindles.

Other objects of the invention are attained by the provision of a machine into which is incorporated the improved mechanism hereof.

BRIEF DESCRIPTION OF THE DRAWINGS

FIG. 3 is a fragmentary sectional view taken along line 3—3 of FIG. 2, drawn to a further enlarged scale and showing in phantom line and full line, respectively, two alternative, axially shifted positions of the depicted spindle; and FIG. 4 is a fragmentary edge view of the front boss of which the head of the mechanism is comprised.

DETAILED DESCRIPTION OF THE PREFERRED AND ILLUSTRATED EMBODIMENTS

Figure 1:
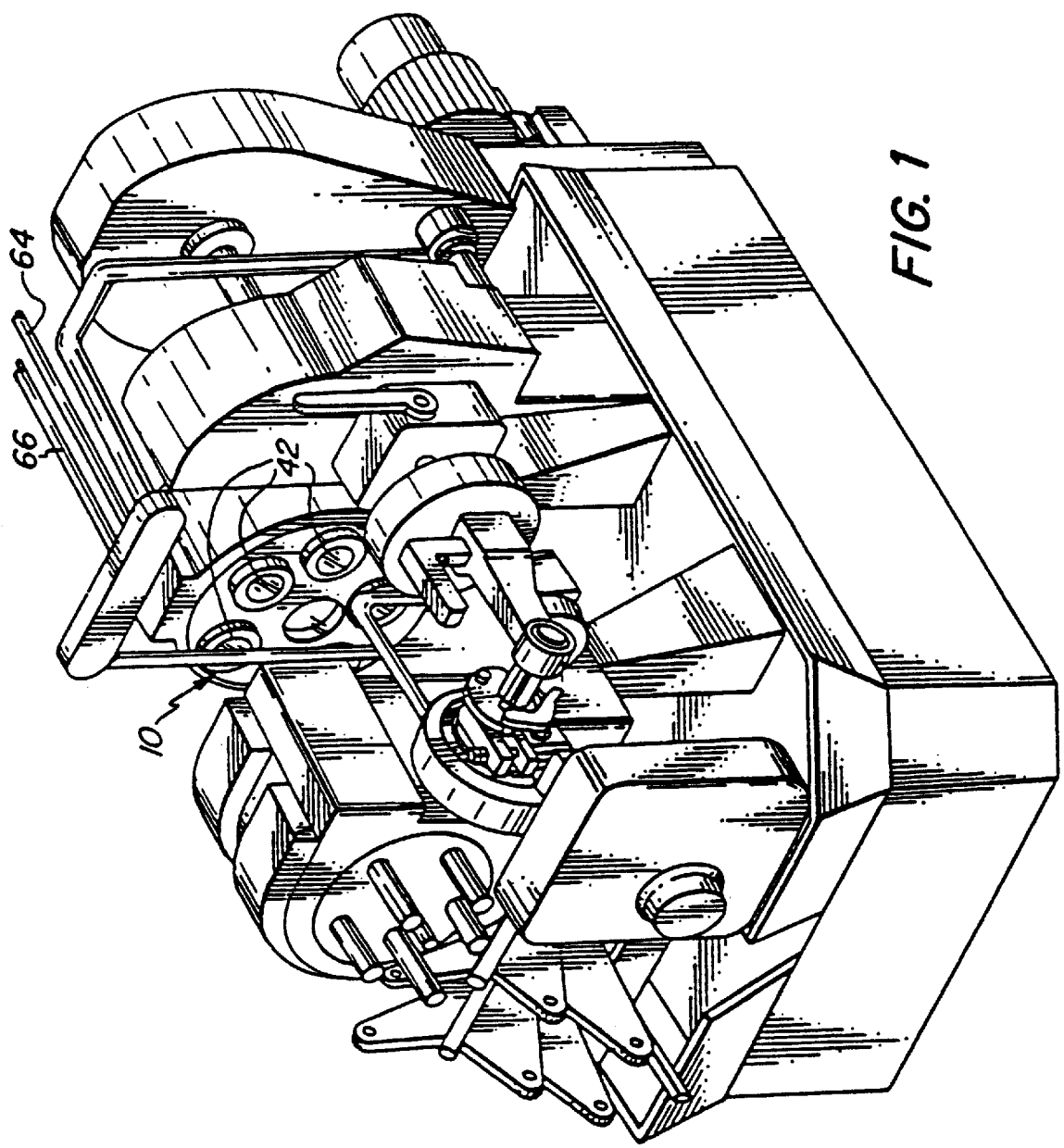
FIG. 1 is a perspective, schematic view of a five-spindle automatic screw machine embodying the invention and incorporating the mechanism hereof.

Turning now in detail to the appended drawings, FIG. 1 depicts the mechanism of the invention (only the revolving head of which is visible) installed in a five-spindle automatic screw machine, for which application it is particularly well-adapted. Such machines are commercially available from Davenport Machine Tool Co., Inc., and others.

Figure 2:
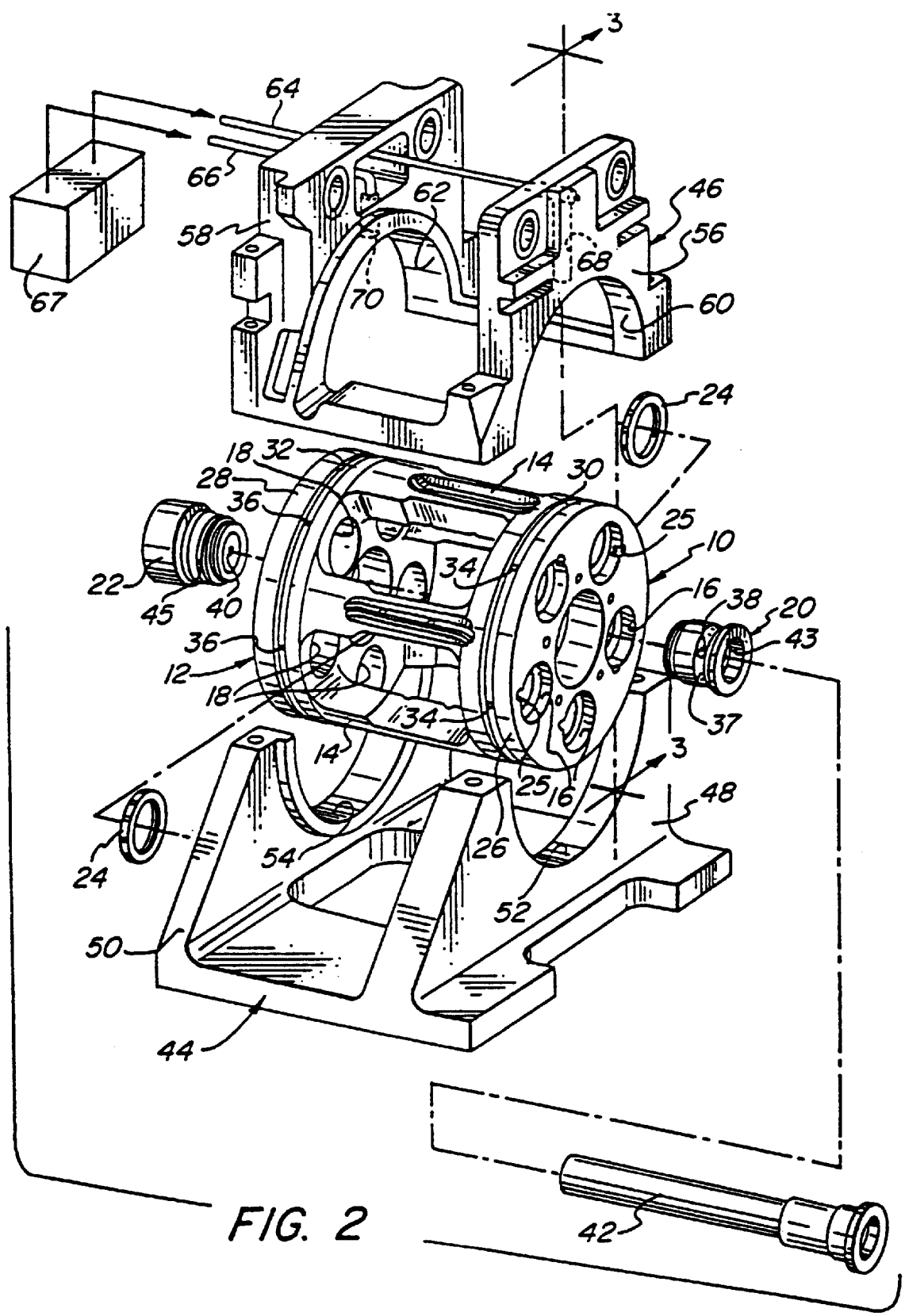
FIG. 2 is an exploded perspective view of the mechanism of the invention, drawn to a scale enlarged from that of FIG. 1.

As best seen in FIG. 2, the revolving head consists of a front boss, generally designed by the numeral 10, and a back or rear boss generally designated by the numeral 12, connected in spaced relationship by five ribs 14. The bosses 10, 12 are coaxial and of the same diameter, and are formed with axially aligned openings 16, 18 in which are seated work and thrust bearings, generally designated respectively by the numerals 20 and 22. The bearings 20, 22 are secured in place by retention nuts 24, and they carry radial roll pins (not seen) which are received in notches 25 along the edges of the openings 16, 18 to affix the bearings against rotation relative to the bosses 10, 12. Bearing surfaces 26 and 28 circumscribe the front boss 10 and the rear boss 12, respectively, into which surfaces are formed continuous circumferential grooves 30, 32. Five ducts 34, 36 extend radially from each of the grooves 30 and 32 and open at the surfaces that define each of the openings 16 and 18 (it will be appreciated that a plurality of side-by-side ducts could be employed in place of a single duct, if so desired).

As is best seen in FIG. 3, a groove 37 circumscribes the exterior surface of the bearing 20, from which extends a port 38. The bearings 22 similarly have circumferential grooves 45 with connecting ports 40 which, it will be appreciated, also lead to the internal bearing surfaces thereof.

Although not visible in FIG. 1, the revolving head of the mechanism is mounted in the machine by a housing that consists of a base 44 and an upper frame 46, normally secured in assembly (by means not illustrated) with the head journalled therebetween. For that purpose, the base 44 has a forward wall portion 48 and a rearward wall portion 50, which have semicircular bearing surfaces 52, 54 formed thereon, respectively. Similarly, the upper frame 46 has a forward portion 56 and a rearward portion 58, with respective semicircular bearing surfaces 60 and 62. Two tubes 64 and 66 lead from an oil supply system 67 to passages 68, 70 in the forward and rearward portions 56, 58 of the upper frame 46.

Although the description that follows is directed primarily to the front boss and the associated components, it will be appreciated that the rear boss, and its components, will advantageously incorporate the same or similar features. FIG. 3 shows the passage 68 in the forward upper frame portion 56 in registry with, and opening to, the circumferential groove 30 of the front boss 10; it also shows the duct 34 in registry with the groove 37 in the outer surfaces of the bearing 20. Oil introduced under pressure into the tube 64 will flow through the passage 68 to distribute over the bearing surfaces 26, 52, 60. It will at the same time be forced along the circumferential groove 30, passing therefrom through the duct 34 of the boss 10 and into the groove 37, then flowing through the port 38 and exiting into the axial groove 41 to distribute over the interior surface 43 of the bushing 20, and thereby to lubricate the contacting surfaces of the spindle 42.

Features that characterize and distinguish the mechanism and machine of the present invention are shown in greatest detail in FIGS. 3 and 4. The port 38 has a diameter "D", the mouth or entrance to the groove 30 has a width "C", the duct 34 has a diameter "B", and the passage 68 has a diameter "A". The diameter "B" of the duct 34 is substantially larger than the width "C" of the entrance to the groove 30, and the diameter "A" of the passage 68 is substantially larger than the duct diameter "B".

More specifically, the width "C" will usually be about 40% to 60% of the diameter "B", and the diameter "B" will in turn usually be about 40% to 60% of the distance "A"; the diameter "D" is larger than diameter "B", and will typically be equal to diameter "A". As a practical matter the entrance to the groove should not be narrower than 0.125 inch, and it should be defined by sharp corners (i.e., having a radius of no more than 0.003 inch); typically, the groove will be about 0.080 to 0.125 inch deep. The dimensions employed in any given case will of course depend on a number of factors, such as operating RPM values, pressures developed, and oil viscosity, and will readily be determined by those skilled in the art.

Because of the dimensional relationships expressed above, oil exiting under pressure from the opening of the passage 68 (which, as can be seen in FIG. 4, encompasses a circumferential portion of the entrance to the groove 30 having a substantially smaller area) will not pass readily through the duct 34. Instead, it will be forced to distribute over the mating cylindrical bearing surfaces 26, 60, and to flow along the circumferential groove 30 (as shown by the arrows in FIG. 4). A very substantial portion of the oil delivered will therefore be directed away from the top spindle and toward the spindles in lower positions, thereby constantly and simultaneously lubricating all of the spindles in parallel. Indeed, because of the structure described a pool or reservoir of oil will tend to collect (by gravity flow) at the bottom of the boss (i.e., along the surfaces 52, 54 of the wall portions 48 and 50 of the base 44), thus providing an ample supply of oil where it is needed most; the lower spindles are typically subjected to the highest loading in the machine duty cycle.

The system ensures that no spindle will start from a "dry" or relatively oil-starved condition, even at start-up or when an incomplete index occurs, and it virtually eliminates spindle seizure. In addition, the system provides 360° lubrication for the head boss(es) and journals, and is applicable for machines in which the spindles are supported by needle or roller bearings, as well as systems (such as Davenport machines) in which solid bronze bearings and bearing/ bushing assemblies are employed. This is in contrast to the system described in the above-identified Nowak patent which, because it is designed for the delivery of an oil mist, cannot be employed in a mechanism that employs open (i.e., non-solid) spindle bearings.

Many variations of the system, mechanism, and machine described herein will occur to those skilled in the art without departure from the invention claimed. For example, although the oil distribution grooves are described as being formed into the head bosses, they might be formed into the mating journal surfaces as well, albeit less desirably so. Also, it should perhaps be noted particularly that the concepts herein described are applicable for the reconditioning or remanufacture of machine components, as well as for original equipment manufacture.

Thus, it can be seen that the present invention provides a multiple-spindle mechanism, and a machine incorporating the same, in which all of the spindles are lubricated simultaneously and continuously, and in which lubrication of the lower spindles may be favored. The mechanism is of relatively incomplex construction, and is especially well suited for use in and as an automatic screw machine.

Having thus described the invention, what is claimed is:

1. In a multiple-spindle mechanism, including a housing having a forward journal portion with a circular internal bearing surface; a revolving head mounted for rotation in said housing and comprising a front boss having a circumferential external bearing surface in contact with said internal bearing surface of said housing, and a multiplicity of spindle bearings mounted at spaced locations thereabout, each of said spindle bearings having an internal bearing surface; a multiplicity of spindles, each rotatably mounted in an associated one of said spindle bearings and having a cylindrical external bearing surface in contact with said internal bearing surface of said associated bearing; and means for supplying liquid lubricant to at least certain of said bearing surfaces in contact with one another, said head having a continuous groove formed into said circumferential external bearing surface of said front boss, and having an entrance at said bearing surface and having at least one duct operatively connecting said internal bearing surface of each of said spindle bearings to said groove, said housing having a passage operatively connected to said means for supplying and with an opening onto said circumferential external bearing surface of said front boss at the entrance to said groove formed thereinto, said opening from said housing passage having a first area and registering with a circumferential portion of said groove entrance; the improvement wherein said circumferential portion of said groove entrance, which has a length and a width, is encompassed by said passage opening and has a second area that is, defined by said length and said width of said groove entrance along said groove portion, said second area being substantially smaller than said first area, and wherein the smallest cross section along the length of said at least one duct has a third area, said third area being at least as large as said second area.

2. The mechanism of claim 1 wherein said third area is substantially larger than said second area.

3. The mechanism of claim 2 wherein said third area has a value equal to about 40% to 60% of the value of said first area, and wherein said second area has a value equal to about 40% to 60% of the value of said third area.

4. The mechanism of claim 3 wherein said at least one duct comprises two sections lying sequentially along a radius from the axis of spindle rotation within the associated spindle bearing, each of said duct sections having a uniform cross section along substantially its entire length, the cross section of the one of said duct sections more remotely from said axis of spindle rotation having said third area and the cross section of the other of said duct sections, lying more proximate to said axis of spindle rotation having a fourth area which is larger than said third area.

5. The mechanism of claim 4 wherein said fourth area has a value substantially equal to the value of said first area.

6. The mechanism of claim 1 wherein said spindles and spindle bearings are constructed and assembled for reciprocal axial movement of said spindles in said associated bearings, said spindles being constructed and disposed for holding workpieces at a machining station forwardly of said front boss.

7. The mechanism of the claim 1 wherein said spindles are disposed at equiangularly spaced locations, with their axes of rotation parallel to the axis of rotation of said head.

8. The mechanism of claim 1 wherein said internal bearing surface of each of said spindle bearings is continuous and has a groove formed thereinto extending generally parallel to said axis of rotation of said associated spindle.

9. The mechanism of the claim 1 wherein said spindle bearings are fixed against rotation relative to said front boss, and wherein there are five of said spindles and associated bearings.

10. The mechanism of claim of 1 wherein said housing also has a rearward journal portion with a second circular internal bearing surface coaxial with said first-mentioned circular internal bearing surface; wherein said head has a rear boss with a circumferential external bearing surface in contact with said second internal bearing surface, and with a multiplicity of spindle bearings mounted at spaced locations about said rear boss, each of said spindle bearings of said rear boss having an internal bearing surface, and each of said spindles being rotatably mounted in an associated one of said rear boss bearings and having a cylindrical external bearing surface in contact with said internal bearing surface thereof, said head having a second continuous groove formed into said circumferential external bearing surface of said rear boss, with an entrance having said second area, and a second multiplicity of said at least one duct operatively connecting said internal bearing surfaces of said rear boss spindle bearings to said second circumscribing groove; and said housing having a second passage operatively connected to said means for supplying and opening onto said circumferential external bearing surface of said rear boss at the entrance to said second circumscribing groove, said opening from said second passage having said first area.

11. An automatic screw machine including the mechanism of claim 1, said machine having a workpiece machining station disposed in front of said spindles.

\* \* \* \* \*